United States Patent
Lee et al.

(10) Patent No.: US 11,189,868 B2
(45) Date of Patent: Nov. 30, 2021

(54) BATTERY MODULE OF CELL EDGE DIRECT COOLING SCHEME, AND BATTERY PACK COMPRISING SAME

(71) Applicant: LG CHEM, LTD., Seoul (KR)

(72) Inventors: Jae-Ki Lee, Daejeon (KR); Bum-Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 159 days.

(21) Appl. No.: 16/610,854

(22) PCT Filed: Jun. 8, 2018

(86) PCT No.: PCT/KR2018/006545
§ 371 (c)(1),
(2) Date: Nov. 4, 2019

(87) PCT Pub. No.: WO2019/112125
PCT Pub. Date: Jun. 13, 2019

(65) Prior Publication Data
US 2021/0143498 A1    May 13, 2021

(30) Foreign Application Priority Data
Dec. 6, 2017  (KR) .................. 10-2017-0166433

(51) Int. Cl.
*H01M 10/6563*    (2014.01)
*H01M 10/613*    (2014.01)
(Continued)

(52) U.S. Cl.
CPC ..... *H01M 10/6563* (2015.04); *H01M 10/613* (2015.04); *H01M 10/625* (2015.04);
(Continued)

(58) Field of Classification Search
CPC ................................ H01M 10/6563
See application file for complete search history.

(56) References Cited

U.S. PATENT DOCUMENTS 10,434,881 B2    10/2019  Chung et al.
2010/0275619 A1*  11/2010  Koetting ............. H01M 10/613
                                                                 62/79
(Continued)

FOREIGN PATENT DOCUMENTS

JP    2013-16301 A    1/2013
JP    2014-112479 A    6/2014
(Continued)

OTHER PUBLICATIONS

Extended European Search Report for European Application No. 18885594.4, dated Nov. 5, 2020.
(Continued)

*Primary Examiner* — Brian R Ohara
(74) *Attorney, Agent, or Firm* — Birch, Stewart, Kolasch & Birch, LLP

(57) ABSTRACT

A battery module includes a module housing provided in an angular tube shape and a cell assembly having a plurality of pouch-type battery cells stacked and arranged in one direction with broad surfaces being erect and accommodated in the module housing. The battery module includes a sensing assembly configured to electrically connect electrode leads extending from the pouch-type battery cells and cover a front portion and a rear portion of the cell assembly, respectively. Flow paths through which a cooling air flows are formed between a top plate and the cell assembly and between a bottom plate and the cell assembly, respectively, the top and bottom plates serving as upper and lower portions of the module housing. Ventilation holes for allowing the cooling air to flow into and out of the flow path are formed at a top end and a bottom end of the sensing assembly.

15 Claims, 12 Drawing Sheets

(51) Int. Cl.
    *H01M 10/625*     (2014.01)
    *H01M 10/63*     (2014.01)
    *H01M 10/647*     (2014.01)

(52) U.S. Cl.
    CPC ......... *H01M 10/63* (2015.04); *H01M 10/647* (2015.04); *H01M 2220/20* (2013.01)

(56) References Cited

U.S. PATENT DOCUMENTS

| | | |
|---|---|---|
| 2012/0301747 A1 | 11/2012 | Han et al. |
| 2014/0178721 A1 | 6/2014 | Chung et al. |
| 2015/0194714 A1 | 7/2015 | You et al. |
| 2015/0249278 A1 | 9/2015 | Park et al. |
| 2018/0047954 A1 | 2/2018 | Yoo et al. |

FOREIGN PATENT DOCUMENTS

| | | |
|---|---|---|
| JP | 5741415 B2 | 7/2015 |
| KR | 10-2009-0002428 A | 1/2009 |
| KR | 10-2011-0095560 A | 8/2011 |
| KR | 10-2012-0055156 A | 5/2012 |
| KR | 10-2012-0132338 A | 12/2012 |
| KR | 10-2012-0140607 A | 12/2012 |
| KR | 10-2013-0035192 A | 4/2013 |
| KR | 10-1326182 B1 | 11/2013 |
| KR | 10-2014-0014413 A | 2/2014 |
| KR | 10-2014-0073636 A | 6/2014 |
| KR | 10-2014-0142770 A | 12/2014 |
| KR | 10-2014-0144781 A | 12/2014 |
| KR | 10-2015-0102632 A | 9/2015 |
| KR | 10-2016-0148398 A | 12/2016 |
| KR | 10-2017-0034560 A | 3/2017 |
| WO | WO 2013/168989 A1 | 11/2013 |

OTHER PUBLICATIONS

International Search Report issued in PCT/KR2018/006545 (PCT/ISA/210), dated Oct. 1, 2018.

* cited by examiner

US 11,189,868 B2

BATTERY MODULE OF CELL EDGE DIRECT COOLING SCHEME, AND BATTERY PACK COMPRISING SAME

TECHNICAL FIELD

The present disclosure relates to a battery module and a battery pack including the battery module, and more particularly, an air-cooled battery module in which air flow is guided along edge portions of battery cells, and a battery pack including the battery module. The present application claims priority to Korean Patent Application No. 10-2017-0166433 filed on Dec. 6, 2017 in the Republic of Korea, the disclosures of which are incorporated herein by reference.

BACKGROUND ART

Recently, secondary batteries have been widely applied not only to portable devices but also to electric vehicles (EV), hybrid electric vehicles (HEV), electric energy storage systems (ESS) and the like driven by electric driving sources.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

When a plurality of secondary battery cells are connected in series and/or in parallel to constitute a battery pack, generally, a battery module is constructed using a predetermined number of secondary battery cells, and then a battery pack is constructed using at least one battery module by adding other components thereto. Here, the secondary battery cells of the battery module or the battery pack may be generally pouch-type secondary batteries, which are capable of being easily stacked.

Meanwhile, the pouch-type second batteries generate heat during charging and discharging. Since the pouch-type second batteries are packed in a tight space inside the battery module, the temperature of the battery module may rise significantly during operation. If the temperature of the battery module is higher than a proper temperature, the performance may be deteriorated and, in severe cases, the battery module may be fired or exploded. Thus, it is very important to secure a cooling means in configuring the battery module.

Cooling methods of the battery module are representatively classified into two types, namely an air cooling type and a water cooling type, and the air cooling type is more widely used than the water cooling type due to electricity leakage or waterproofing.

An air-cooled battery module according to the conventional art is generally designed to have a gap between battery cells stacked in one direction to secure a flow path, so that air may pass through the flow path. For example, Korean Unexamined Patent Publication No. 10-2013-0035192 discloses a technique in which a gap is provided between a unit cell and a unit cell so that air flows between the unit cell and the unit cell to cool the battery cells. Also, Korean Unexamined Patent Publication No. 10-2014-144781 discloses a technique in which two cooling fins are contacted between a battery cell and a battery cell, and a flow path is provided between the two cooling fins to allow air to flow so that the battery cell is indirectly cooled by the cooling fins cooled by the air.

However, the air-cooled battery module according to the conventional art has two problems. First, in the case of a middle- or large-sized battery module or battery pack, the energy density per unit volume is low due to the gap between the unit cell and the unit cell for securing the air flow path. Second, when shock or vibration is applied, the unit cell and the unit cell may be closely adhered to each other to eliminate the flow path, or the flow path may be blocked due to a foreign matter entering into the narrow flow path. In addition, in order to keep the gap between the unit cells and the unit cells constantly, subsidiary components such as a cartridge are required. Thus, a cartridge assembling process should be added, thereby increasing the cost.

DISCLOSURE

Technical Problem

The present disclosure is designed to solve the problems of the related art, and therefore the present disclosure is directed to providing a battery module, which may increase the energy density by eliminating the gap between battery cells and constructing a flow path so that air flow is concentrated at an edge region of the battery cells.

In addition, the present disclosure is directed to provide a battery pack, which includes at least one battery module and has an air flow guiding structure for concentrating the air flow to an edge region of the battery cells.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a module housing provided in an angular tube shape, the module housing having a top plate and a bottom plate, and a cell assembly having a plurality of pouch-type battery cells stacked and arranged in one direction with broad surfaces being erect and accommodated in the module housing, a sensing assembly configured to electrically connect electrode leads extending from the plurality of pouch-type battery cells and cover a front portion and a rear portion of the cell assembly, respectively, wherein flow paths through which a cooling air flows are formed between the top plate and the cell assembly and between the bottom plate and the cell assembly, respectively, the top and bottom plates serving as upper and lower portions of the module housing, and wherein ventilation holes for allowing the cooling air to flow into and out of the flow path are formed at a top end and a bottom end of the sensing assembly.

The sensing assembly may include a bus bar connected to the electrode leads and a sensing housing having a plurality of sensing housing parts that are detachable from each other and successively assembled in one direction, the bus bar being mounted to a front surface of the plurality of sensing housing parts, and the ventilation holes may be formed at a top end and a bottom end of each of the plurality of sensing housing parts.

The pouch-type battery cells may be disposed so that broad surfaces thereof are in contact with each other.

The plurality of sensing housing parts may respectively have a convex protrusion and a concave groove corresponding to each other and are assembled by fitting the convex protrusion into the concave groove.

According to another embodiment of the present disclosure, the battery module may further comprise a heat pipe adhered to an edge portion of each of the plurality of pouch-type battery cells on the flow path and having one end exposed out of one of the ventilation holes.

The heat pipe may be provided in a number equal to a number of the plurality of pouch-type battery cells.

In another aspect of the present disclosure, there is also provided a battery pack, comprising: at least one battery module as described above; a pack case having a box shape capable of accommodating the at least one battery module in an inner space thereof; and a coolant supplier coupled to one side of the pack case to supply a cooling air to the ventilation holes at one side of the at least one battery module.

The at least one battery module may be at least two battery modules disposed in parallel so that the ventilation holes of the battery modules are located on the same line, the ventilation holes located in a front portion of the battery modules are defined as inlet ventilation holes through which the cooling air is introduced, the ventilation holes located in a rear portion of the battery modules may be defined as outlet ventilation holes through which the cooling air is discharged, and the pack case may include a coolant channel provided inside the pack case along a first direction in which the inlet ventilation holes of the battery modules are arranged and configured to communicate with the coolant supplier so that the cooling air is guided to flow in the first direction.

The coolant channel may have a longitudinal section of an arc shape that is in contact with the sensing assembly so that an open end of the coolant channel surrounds the inlet ventilation holes.

The pack case may include an upper plate contacting the top plate of the battery module and a lower plate contacting the bottom plate of the battery module, and the coolant channel may include an upper coolant channel integrally formed with the upper plate and a lower coolant channel integrally formed with the lower plate.

The sensing assembly may further include an upper protruding plate contacting a bottom of a lower surface of the upper coolant channel and a lower protruding plate contacting a top of an upper surface of the lower coolant channel.

The pack case may include a wall having at least one opening and facing the outlet ventilation holes of the battery modules.

The coolant supply unit may include a fan provided at an outer side of the pack case; and a fan duct divided into two branches from the fan to communicate with the upper coolant channel and the lower coolant channel.

Advantageous Effects

According to an embodiment of the present disclosure, it is possible to provide an air-cooled battery module in which a gap between battery cells is eliminated and a flow path is provided to concentrate the air flow to an edge region of the battery cells, thereby increasing the energy density.

Also, according to another embodiment of the present disclosure, it is possible to provide a battery module including a sensing assembly that may be expanded conveniently and easily.

In addition, according to another embodiment of the present disclosure, it is possible to provide a battery pack including a pack case and a fan duct, which are configured so that the flow of a cooling air is concentrated to the flow path of the battery module.

The effects of the present disclosure are not limited to the above, and effects not mentioned herein may be clearly understood from the present specification and the accompanying drawings by those skilled in the art.

BEST MODE

Figure 1:
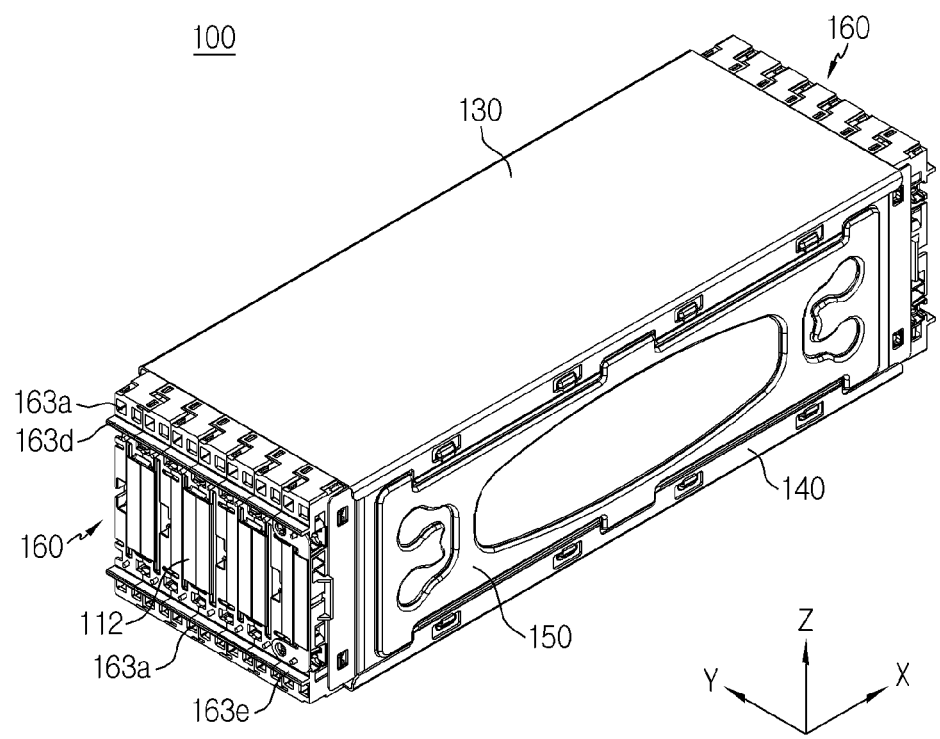
FIG. 1 is a perspective view showing a battery module according to an embodiment of the present disclosure.

The examples described herein and the configurations shown in the drawings are only embodiments of the present disclosure and do not represent all of the technical ideas of the present disclosure. Thus, it should be understood that there are a variety of equivalents and modifications capable of replacing the embodiments.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
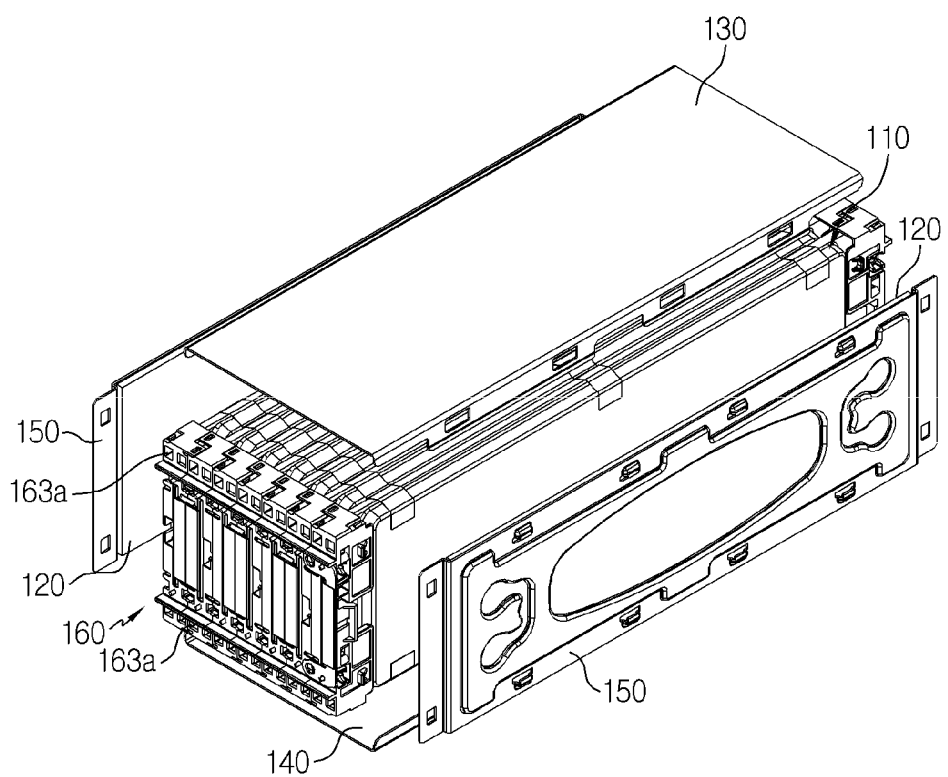
FIG. 2 is a partially exploded perspective view showing the battery module of FIG. 1.
Figure 3:
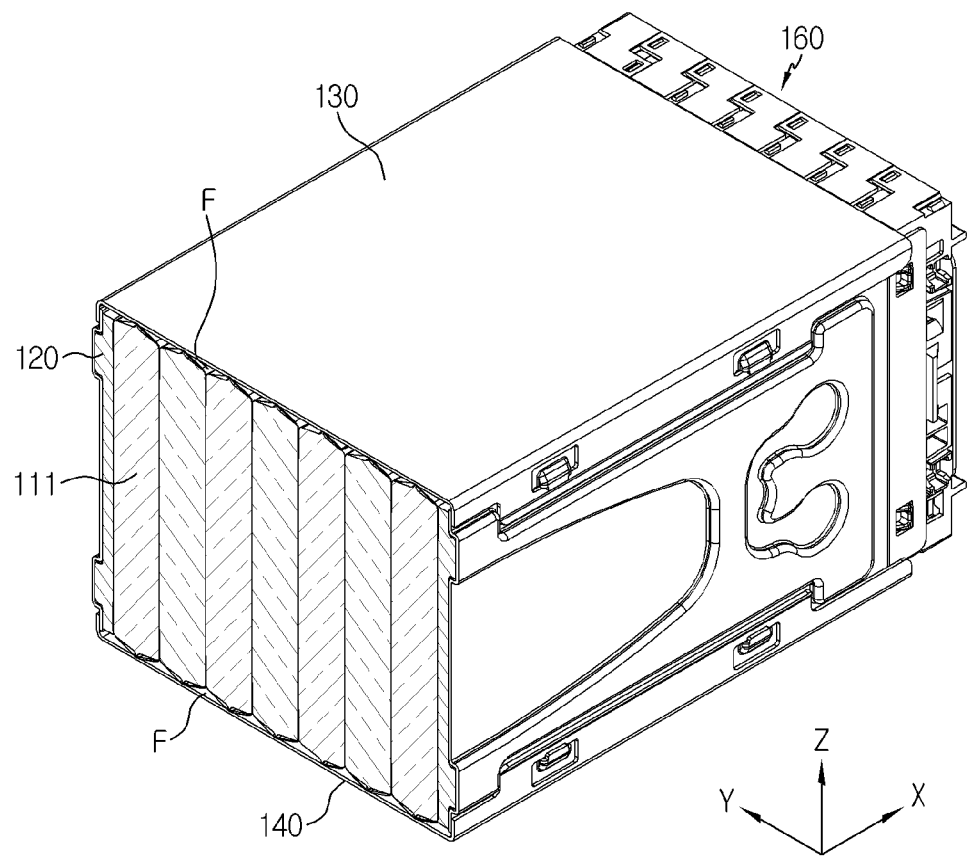
FIG. 3 is a perspective view showing the battery module, sectioned in a longitudinal direction.
Figure 4:
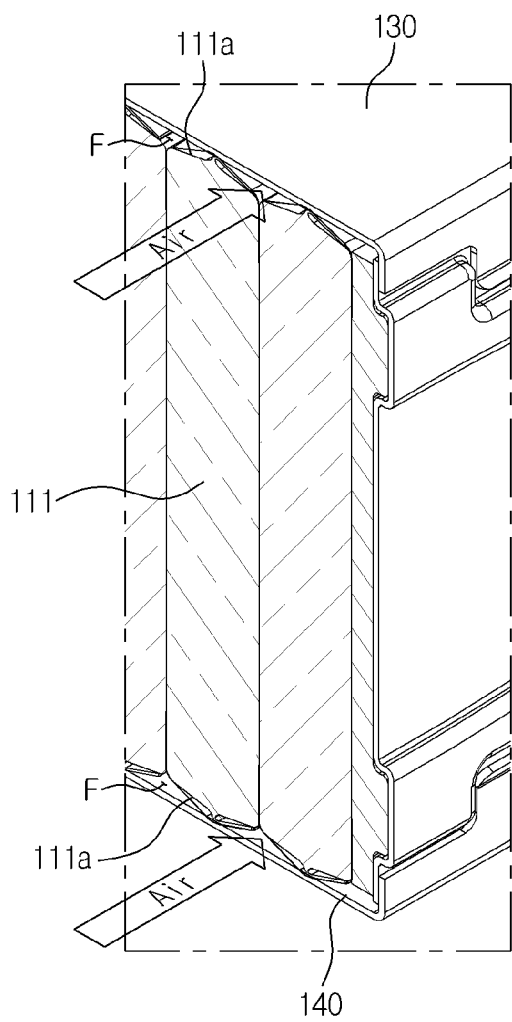
FIG. 4 is a partially enlarged view of FIG. 3.

FIG. 1 is a perspective view showing a battery module according to an embodiment of the present disclosure, FIG. 2 is a partially exploded perspective view showing the battery module of FIG. 1, FIG. 3 is a perspective view showing the battery module, sectioned in a longitudinal direction, and FIG. 4 is a partially enlarged view of FIG. 3.

Referring to FIGS. 1 to 4, a battery module 100 according to an embodiment of the present disclosure includes a cell assembly 110, a pair of buffer pads 120, top and bottom plates 130, 140, a pair of side plates 150 and a sensing assembly 160.

The cell assembly 110 is a cell stack including only pouch-type battery cells 111. The pouch-type battery cells 111 are perfectly closely adhered to each other to make surface contact and arranged in one direction so that their broad surfaces are erect. Thus, edge portions 111a at both sides of the pouch-type battery cells 111 form a top end and a bottom end of the cell assembly 110. Here, the edge portion 111a of the pouch-type battery cell 111 is also called a wing.

Since the pouch-type battery cells 111 are adhered to each other as close as possible without any component, the cell assembly 110 according to the present disclosure has a high energy density per unit volume, compared with a conventional air-cooled battery module 100 having an air flow path between battery cells 111.

A pair of buffer pads 120 may be disposed at both side surfaces of the cell assembly 110. In the pouch-type battery cell, the electrode may be thickened due to repeated charging and discharging, and the electrolyte therein may be decomposed due to side reaction to generate gas. At this time, the phenomenon where the pouch-type battery cell 111 inflates due to the electrode expansion and/or the generated gas is called a 'swelling phenomenon'. For reference, the swelling phenomenon is more seriously affected by the electrode expansion at charging and discharging. The buffer pad 120 prevents or alleviates the expansion of the pouch-type battery cells 111 by compressing the battery cells 111. For example, the buffer pad 120 may be made of an expanded polypropylene (EPP) or an ethylene-vinyl acetate copolymer (EVA) in the form of a foam having a size facing the wide surface of the pouch-type battery cell 111.

The top and bottom plates 130, 140 and the pair of side plates 150 may be provided in a plate shape having a predetermined area and may be disposed at upper and lower sides and both sides of the cell assembly 110 to cover an upper portion, a lower portion, a left surface and a right surface of the cell assembly 110, respectively. The top and bottom plates 130, 140 and the pair of side plates 150 may be generally called end plates, and may be assembled by clinching to configure a module housing of an angular tube shape.

The top and bottom plates 130, 140 and the pair of side plates 150 give a mechanical supporting force to the cell assembly 110 and play a role of protecting the cell assembly 110 from an external impact. Thus, the top and bottom plates 130, 140 and the pair of side plates 150 may be preferably made of a metal material such as steel to secure rigidity.

In particular, as shown in FIGS. 3 and 4, the flow path F of the battery module 100 according to the present disclosure is formed between the top plate 130 and a top end of the cell assembly 110 and between the bottom plate 140 and a bottom end of the cell assembly 110, respectively.

The edge portion 111a of the pouch-type battery cell 111 does not has a flat surface since a thermally fused portion of the pouch exterior is folded at the edge portion. Thus, a space may be formed between the edge portion 111a of the pouch-type battery cell 111 and the top plate 130 or the bottom plate. In the battery module 100 according to the present disclosure, the space is utilized as the flow path F, and the cooling air flows along the flow path F (in an X-axis direction) to directly cool the edge portion 111a of the battery cells 111.

Meanwhile, an inlet and an outlet of the flow path F may be provided at the sensing assembly 160, explained later.

The sensing assembly 160 covers a front portion and a rear portion of the cell assembly 110, respectively, and is used for electrically connecting electrode leads 112 extending from the pouch-type battery cells 111. The sensing assembly 160 may include the sensing housing 162 and a bus bar 161 mounted to a front surface of the sensing housing 162. The electrode leads 112 of the pouch-type battery cell 111 may pass through the sensing housing 162 and be attached to the bus bar 161 by, for example, ultrasonic welding.

In particular, the sensing housing 162 of the present disclosure may include a plurality of sensing housing parts 163 that may be detachable from each other and be assembled successively in one direction.

The unit sensing housing parts 163 are provided in a number corresponding to the number of the pouch-type battery cells 111 and may respectively have a convex protrusion 163b and a concave groove 163c corresponding to each other so as to be assembled with each other by fitting in a block coupling manner.

Figure 5:
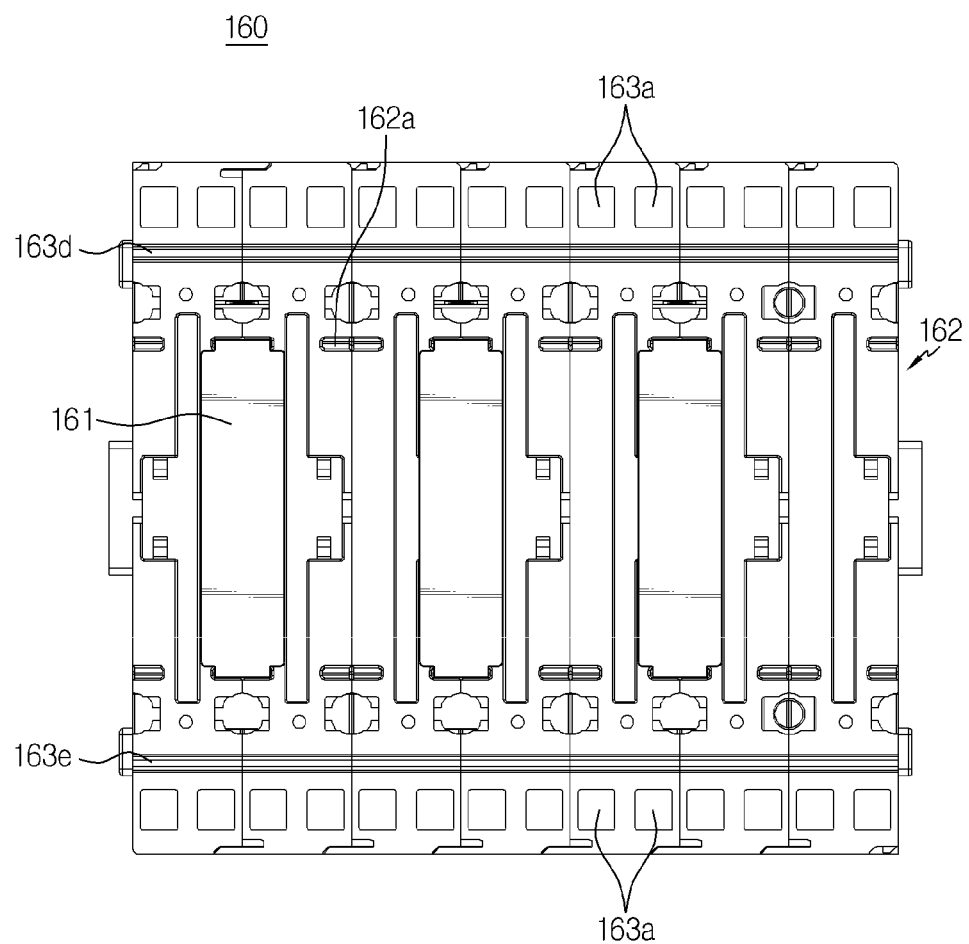
FIG. 5 is a front view showing a sensing assembly according to an embodiment of the present disclosure.
Figure 6:
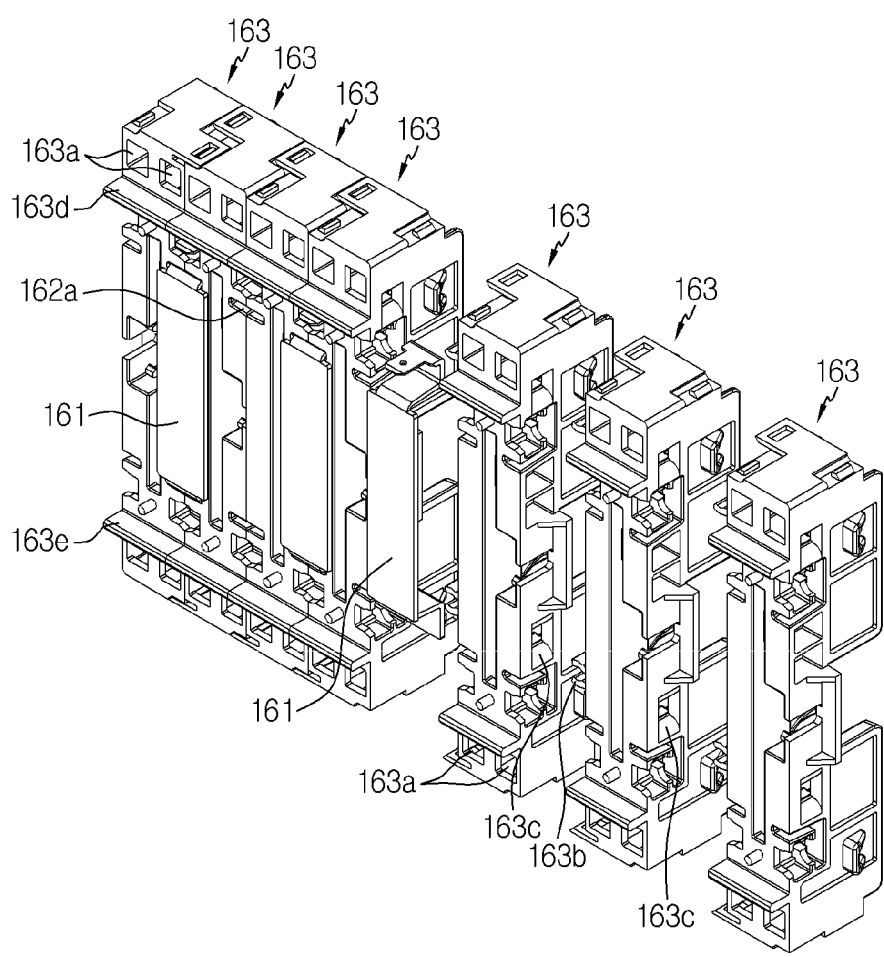
FIG. 6 is a partially exploded perspective view showing the sensing assembly of FIG. 5.

For example, as shown in FIGS. 5 and 6, the sensing housing part 163 may include convex protrusions 163b provided at a left surface thereof and concave grooves 163c provided at a right surface thereof, which is opposite to the left surface. Two sensing housing parts 163 may be assembled to be in contact with each other as the convex protrusion 163b of any one sensing housing part 163 is fit into the concave groove 163c of the other sensing housing part 163. In addition, the sensing housing parts 163 may be coupled to each other by snap-fitting.

In addition, both ends of the bus bar 161 according to the present disclosure are bent doubly, and both ends are fit into slits 162a, which are formed when two sensing housing parts 163 are assembled, so that the bus bar 161 is mounted between two sensing housing parts 163.

The sensing housing parts 163 and the bus bars 161 are assembled in one direction in the above pattern, thereby completing one sensing assembly 160.

If the sensing assembly 160 is configured by assembling the sensing housing parts 163 and the bus bars 161 as in the present disclosure, even though the number of battery cells 111 is increased to change the width of the cell assembly 110, it is possible to manufacture a sensing assembly 160 compatible with the changed cell assembly 110 by additionally assembling sensing housing parts 163 and bus bars 161 as desired.

In addition, the sensing assembly 160 according to the present disclosure further includes ventilation holes 163a for allowing a cooling air to flow into or out of the flow path F formed in the battery module 100 as described above.

Referring to FIGS. 1 and 5 together with FIG. 6, two sensing assemblies 160 are provided, one at a front portion of the cell assembly 110 and the other at a rear portion thereof, and the ventilation holes 163a are provided at top ends and bottom ends of the front and rear sensing assemblies 160. In other words, the ventilation hole 163a provided in the sensing assembly 160 located at the front portion serves as an inlet of the flow path F, and the ventilation hole 163a provided in the sensing assembly 160 located at the rear portion serves as an outlet of the flow path F.

More specifically, two ventilation holes 163a are respectively provided at a top end and a bottom end of one sensing housing part 163. Here, one pouch-type battery cell 111 is located at the rear of each sensing housing part 163, and two ventilation holes 163a are located on the same line as the edge portions 111a at both sides of one pouch-type battery cells 111 located on the flow path F, respectively.

Thus, the cooling air may be put into the flow path F through the ventilation holes 163a at one side and intensively flow to the edge portions 111a at both sides of the battery cells 111. The cooling air may flow along the edge portions 111a of the individual pouch-type battery cells 111 to absorb heat from the battery cells 111 and then discharge out through the ventilation holes 163a at an opposite side.

If the edges of the battery cell 111 are directly air-cooled as described above, the cooling efficiency is excellent, compared to the indirect cooling method using a cooling plate. Also, since the battery cells 111 may be closely adhered to each other, the energy density may be improved, compared to the conventional air-cooled battery module 100.

Figure 7:
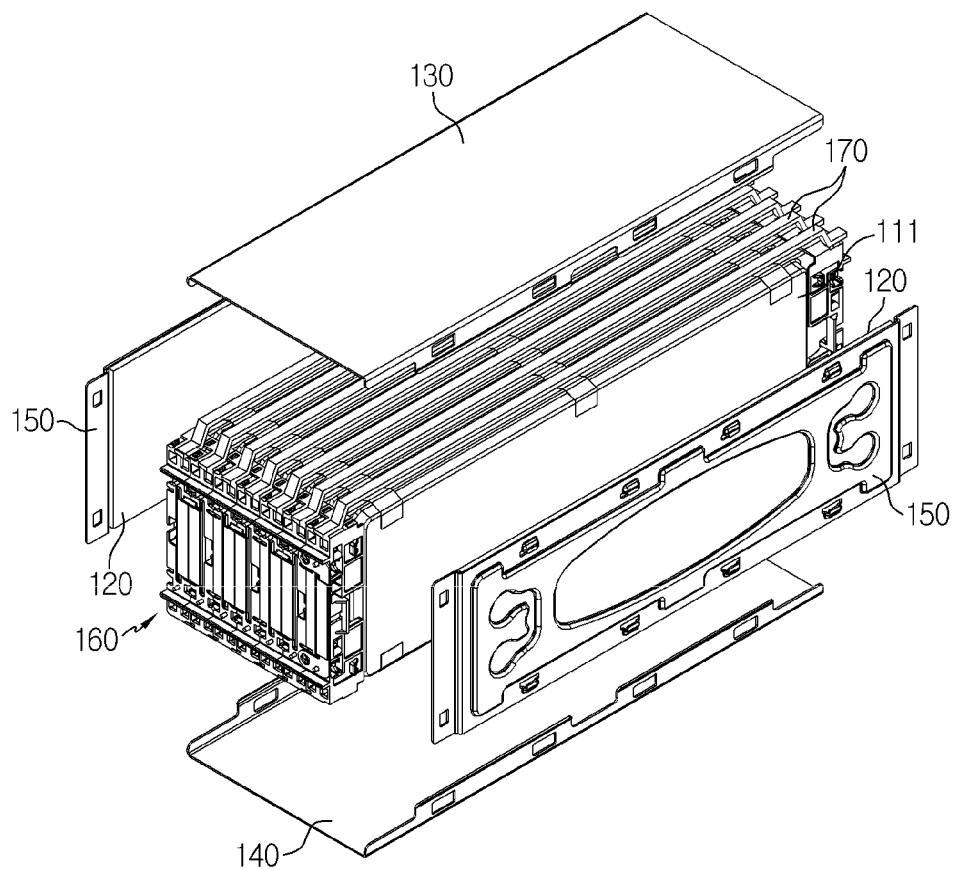
FIG. 7 is a partially exploded perspective view showing a battery module according to another embodiment of the present disclosure, which corresponds to FIG. 2.
Figure 8:
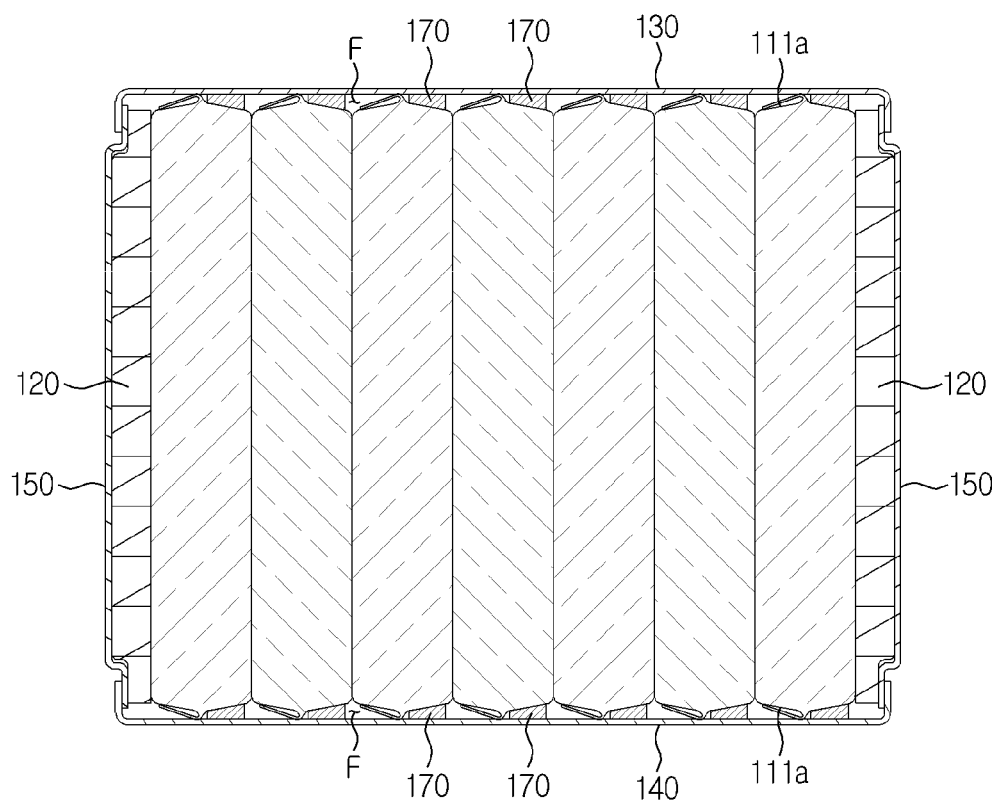
FIG. 8 is a longitudinally sectioned view showing the battery module according to another embodiment of the present disclosure.

Subsequently, a battery module 100 according to another embodiment of the present disclosure will be described with reference to FIGS. 7 and 8. The same reference sign as in the former embodiment designates the same component. The same component will not described again, and features different from the former embodiment will be described in detail.

The battery module 100 of this embodiment may further include a heat pipe 170. The heat pipe 170 is attached to the edge portion 111a of each pouch-type battery cell 111 on the flow path F, and one end of the heat pipe 170 may be installed in or out of the ventilation hole 163a.

For example, when the cell assembly 110 includes battery cells 111 with high C-rate (rated capacity in an hour), the heat pipe 170 having high thermal conductivity may be attached to each battery cell 111 to cool the battery cells 111 by applying direct/indirect cooling using the cooling air and the heat pipe 170.

The battery module of this embodiment may have improved cooling performance, compared to the former embodiment, since the heat pipe 170 is further added.

Figure 9:
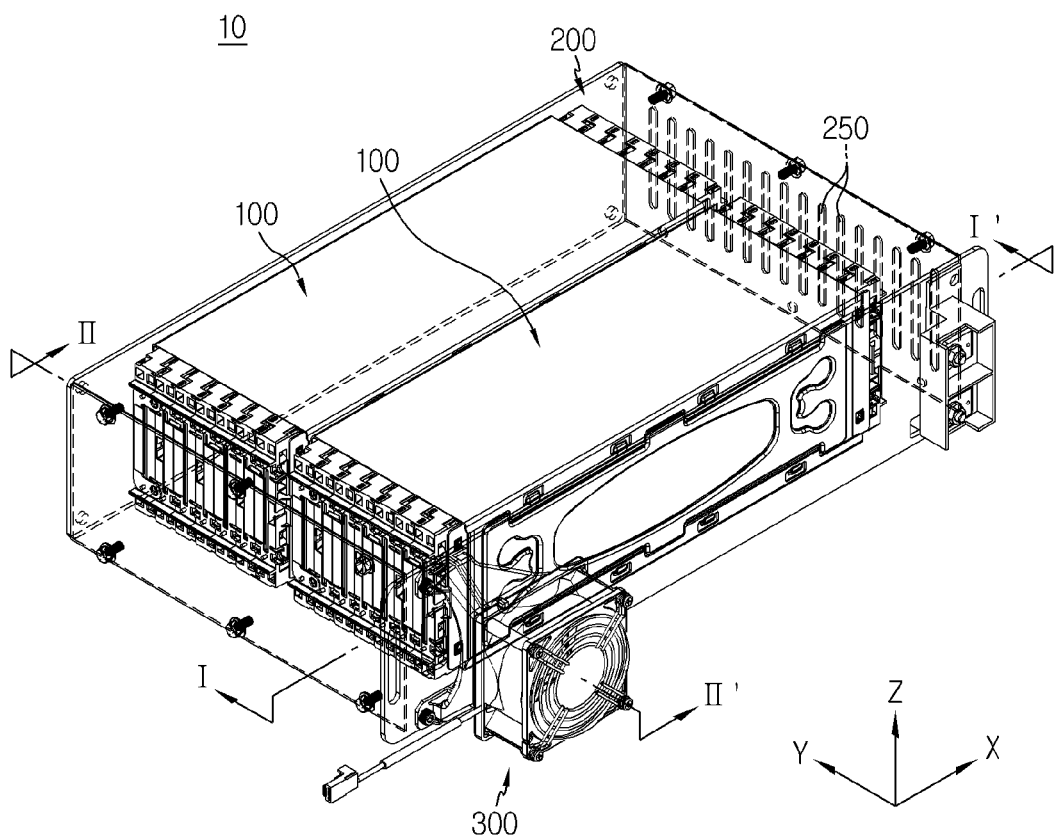
FIG. 9 is a perspective view schematically showing a battery pack according to an embodiment of the present disclosure.

Subsequently, a battery pack 10 according to the present disclosure will be described with reference to FIG. 9. The battery pack 10 includes at least one battery module 100 as described above, a pack case 200 provided in a box shape capable of accommodating the at least one battery module 100 in an inner space thereof, and a coolant supply unit 300 coupled to one side of the pack case 200 to supply a cooling air to the ventilation hole 163a at one side of the at least one battery module 100.

In this embodiment, the battery pack 10 includes two battery modules 100, and the two battery modules 100 are disposed to be closely adhered to each other in parallel so that the ventilation holes 163a located at the front and rear surfaces thereof are located on the same line (in the Y-axis direction), and are electrically connected by an inter bus bar.

Hereinafter, the direction in which the ventilation holes 163a at one side of the battery modules 100, namely the ventilation holes 163a located at the front portion of the battery modules 100, will be referred to as a first direction, and the direction in which the flow path F is formed inside the battery module 100 will be referred to as a second direction. Seeing FIG. 9, the Y-axis direction serves as the first direction, and the X-axis direction serves as the second direction. In addition, the ventilation holes 163a located at the front portion of the battery modules 100 will be referred to as inlet ventilation holes 163a, and the ventilation holes 163a located at the rear surface will be referred as outlet ventilation holes.

Figure 10:
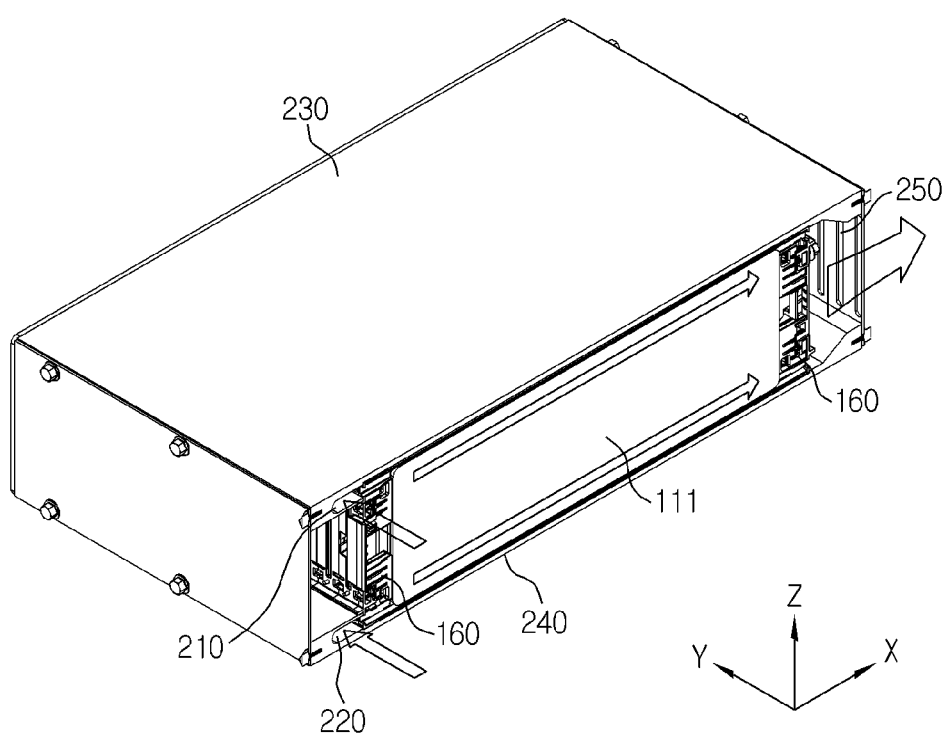
FIG. 10 is a cross-sectioned view showing the battery pack, taken along the line I-I' of FIG. 9.

The pack case 200 according to the present disclosure will be described with reference to FIGS. 10 and 11 together. The pack case 200 includes coolant channels 210, 220 serving as a passage for guiding the flow of air along the first direction in which the inlet ventilation holes 163a of the battery modules 100 are arranged. In addition, the coolant supply unit 300 is mounted to an outer wall of the pack case 200, and the coolant supply unit 300 is provided to communicate only with the coolant channels 210, 220. Thus, if the coolant supply unit 300 is operated, an external air may be introduced only to the coolant channels 210, 220.

In addition, the coolant channels 210, 220 of this embodiment has a longitudinal section of an arc shape that is in contact with the sensing assembly 160 so that open ends 210a, 220a thereof surround the inlet ventilation holes 163a of the battery modules 100.

The external air introduced to the coolant channels 210, 220 may flow in the first direction and be diverged through the inlet ventilation holes 163a to flow in the second direction. The external air passing through the inlet ventilation holes 163a may flow along the edge portions 111a of the battery cells 111, exposed on the flow path F of the battery module 100 as described above, to cool the battery cells 111 and may flow out of the battery modules 100 through the outlet ventilation holes. In addition, the warm air flowing out of the battery modules 100 may be discharged out through the wall of the pack case 200 while maintaining its flowing direction. The wall of the pack case 200 is located at a side opposite to the outlet ventilation holes and has at least one opening 250, and the warm air may flow out of the pack case 200 through the at least one opening 250.

Subsequently, the connection structure of the coolant channels 210, 220 of the pack case 200, the inlet ventilation holes 163a of the battery modules 100, and the coolant supply unit 300 will be described in detail with reference to FIGS. 11 and 12.

In this embodiment, the coolant channels 210, 220 include an upper coolant channel 210 and a lower coolant channel 220, and the upper coolant channel 210 and the lower coolant channel 220 are integrally formed with an upper plate 230 and a lower plate 240 at the pack case 200.

The upper plate 230 and the lower plate 240 face and contact the top and bottom plates 130, 140 of the battery modules 100, respectively, and edge portions at one side of the upper plate 230 and the lower plate 240 are formed in a block shape thicker than the other region.

In the upper coolant channel 210 and the lower coolant channel 220, the longitudinal section at an edge portion of the block shape of the upper plate 230 and the lower plate 240 at one side has an arc shape or a "U" shape. In addition, the edge portion at one side of the block shape may be used for bolt-coupling when a side plate is coupled between the upper plate 230 and the lower plate 240.

Meanwhile, the sensing assembly 160 of the battery module 100 may further include an upper protruding plate 163d provided to contact a bottom of a lower surface of the upper coolant channel 210 and a lower protruding plate 163e provided to contact a top of an upper surface of the lower coolant channel 220.

Figure 11:
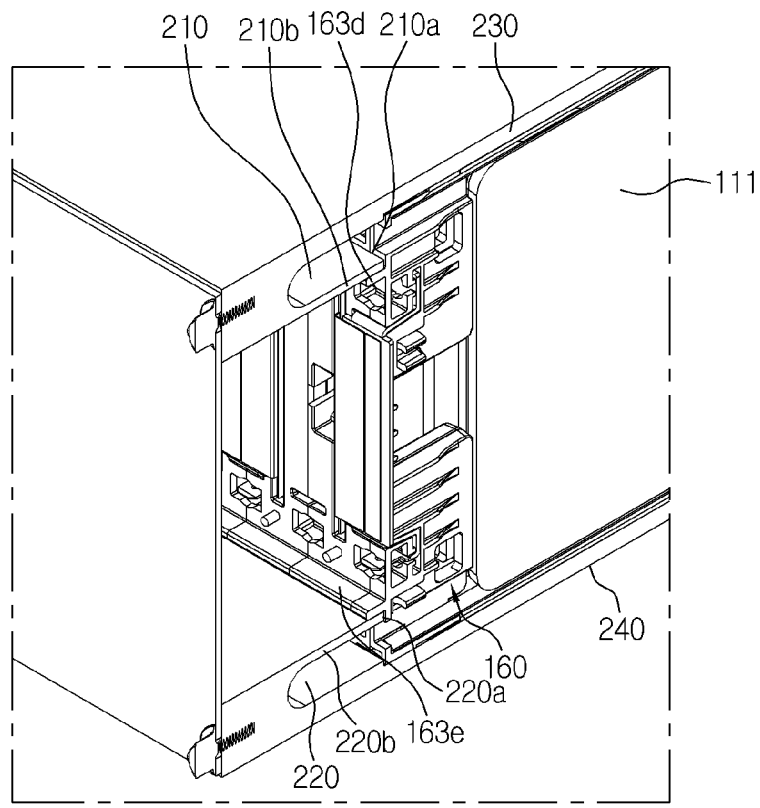
FIG. 11 is a partially exploded perspective view of FIG. 10.

According to this configuration, as in FIG. 11, the battery module 100 may be disposed inside the pack case 200 so that the upper protruding plate 163d and the lower protruding plate 163e are fit into the upper coolant channel 210 and the lower coolant channel 220.

In addition, the front portion of the sensing assembly 160 may be closely disposed to contact the open ends of the upper coolant channel 210 and the lower coolant channel 220. In this case, the inlet ventilation holes 163a are located at two sites above the upper protruding plate 163d and below the lower protruding plate 163e and thus may be perfectly covered by the upper coolant channel 210 and the lower coolant channel 220.

Figure 12:
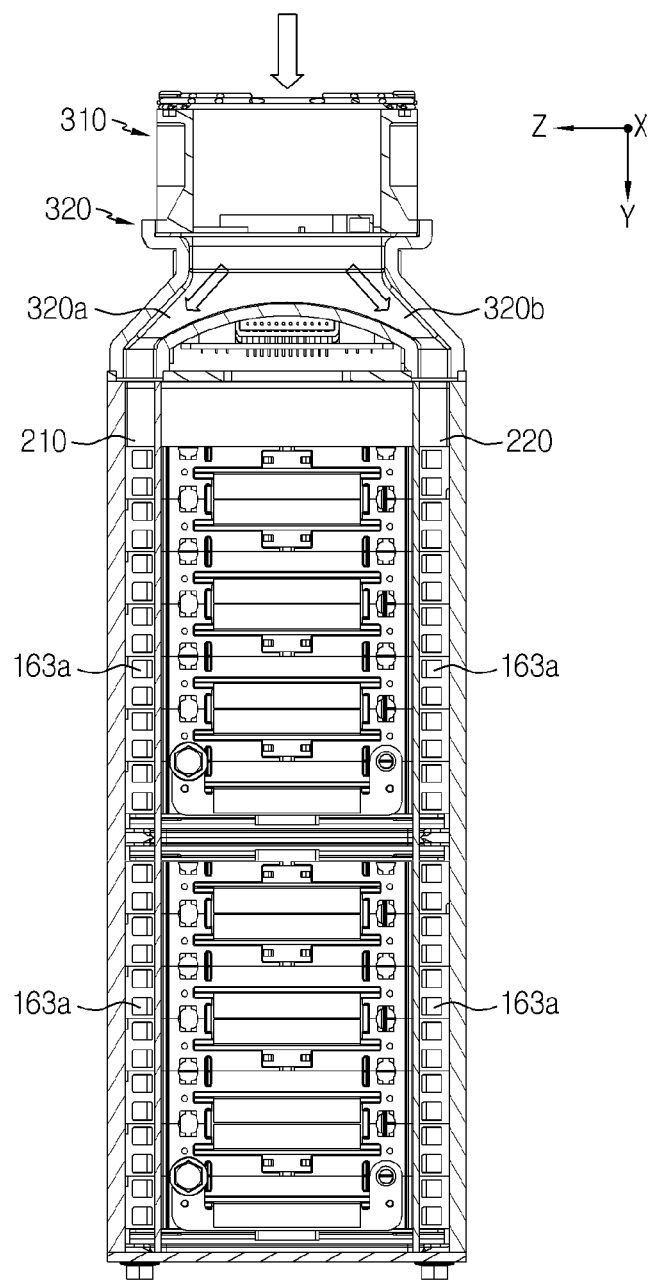
FIG. 12 is a cross-sectioned view showing the battery pack, taken along the line II-II' of FIG. 9.

Referring to FIG. 12, the coolant supply unit 300 includes a fan 310 and a fan duct 320 connected to the coolant channels 210, 220 from the fan 310.

The fan duct 320 includes a first duct 320a and a second duct 320b divided into two branches from the fan 310. The first duct 320a may be provided to communicate with the upper coolant channel 210, and the second duct 320b may be provided to communicate with the lower coolant channel 220. Thus, the fan duct 320 may be understood as forming approximately a "Y"-shaped air passage in the first direction.

In other words, if the fan 310 is operated, the external air may flow into the pack case 200 along the fan duct 320. At this time, the fan duct 320 has a "Y" shape and is connected to the upper coolant channel 210 and the lower coolant channel 220, and thus the flow of external air may be concentrated only to the upper and lower coolant channels 220 inside the pack case 200 while maintaining a high flow velocity. In the pack case 200m the air is diverged while flowing along the upper and lower coolant channels 210, 220 and passes through the inlet ventilation holes 163a, and then flows into the flow path F inside the battery module 100 to cool the battery cells 111.

According to the configuration of the present disclosure as described above, it is possible to provide the battery module 100 and the battery pack 10, which may effectively air-cool the battery cells 111 by eliminating the gap between the battery cells 111 so that the energy density is increased and the flow of air is concentrated to the edge regions of the battery cells 111.

Meanwhile, the battery pack 10 according to the present disclosure may include at least one battery module according to the present disclosure, a pack case and a coolant supply unit, and also, even though not shown in detail, the battery pack may further include various devices for controlling charging/discharging of the battery module, such as BMS, a current sensor, a fuse and the like, in addition to the battery module 10.

The battery pact according to the present disclosure may be applied to vehicles such as electric vehicles and hybrid electric vehicles or power storage devices (ESS).

Even though the present disclosure has been described based on the limited embodiments and drawings, it should be understood that the present disclosure is not limited thereto, but various changes and modifications can be made within the scope of the appended claims by those skilled in the art.

Meanwhile, when the terms indicating up, down, left and right directions are used in the specification, it is obvious to those skilled in the art that these terms are selected merely for convenience in explanation and may vary based on a location of a target or an observer.

What is claimed is:

1. A battery module, comprising:
a module housing provided in an angular tube shape, the module housing having a top plate and a bottom plate;
a cell assembly having a plurality of pouch-type battery cells stacked and arranged in one direction with broad surfaces being erect and accommodated in the module housing; and
a sensing assembly configured to electrically connect electrode leads extending from the plurality of pouch-type battery cells and cover a front portion and a rear portion of the cell assembly, respectively,
wherein a bottom surface of the top plate and a top surface of the bottom plate are planar,
wherein a top surface and a bottom surface of the cell assembly are nonplanar so that spaces are formed between the cell assembly and the top plate and between the cell assembly and the bottom plate,
wherein flow paths through which a cooling air flows are formed between the top plate and the cell assembly and between the bottom plate and the cell assembly by the spaces, respectively, the top and bottom plates serving as upper and lower portions of the module housing, and
wherein ventilation holes for allowing the cooling air to flow into and out of the flow path are formed at a top end and a bottom end of the sensing assembly.

2. A battery module, comprising:
a module housing provided in an angular tube shape, the module housing having a top plate and a bottom plate;
a cell assembly having a plurality of pouch-type battery cells stacked and arranged in one direction with broad surfaces being erect and accommodated in the module housing; and
a sensing assembly configured to electrically connect electrode leads extending from the plurality of pouch-type battery cells and cover a front portion and a rear portion of the cell assembly, respectively,
wherein flow paths through which a cooling air flows are formed between the top plate and the cell assembly and between the bottom plate and the cell assembly, respectively, the top and bottom plates serving as upper and lower portions of the module housing,
wherein ventilation holes for allowing the cooling air to flow into and out of the flow path are formed at a top end and a bottom end of the sensing assembly,
wherein the sensing assembly includes a bus bar connected to the electrode leads and a sensing housing having a plurality of sensing housing parts that are detachable from each other and successively assembled in one direction, the bus bar being mounted to a front surface of the plurality of sensing housing parts, and
wherein the ventilation holes are formed at a top end and a bottom end of each of the plurality of sensing housing parts.

3. The battery module according to claim 1, further comprising:
a heat pipe adhered to an edge portion of each of the plurality of pouch-type battery cells on the flow path and having one end exposed out of one of the ventilation holes.

4. The battery module according to claim 3, wherein a number of heat pipes is equal to a number of the plurality of pouch-type battery cells.

5. The battery module according to claim 1, wherein the pouch-type battery cells are disposed so that broad surfaces thereof are in contact with each other.

6. The battery module according to claim 2, wherein the plurality of sensing housing parts respectively have a convex protrusion and a concave groove corresponding to each other and are assembled by fitting the convex protrusion into the concave groove.

7. A battery pack, comprising:
at least one battery module as defined in claim 1;
a pack case having a box shape capable of accommodating the at least one battery module in an inner space thereof; and
a coolant supplier coupled to one side of the pack case to supply a cooling air to the ventilation holes at one side of the at least one battery module.

8. A battery pack, comprising:
at least one battery module, comprising
a module housing provided in an angular tube shape, the module housing having a top plate and a bottom plate;
a cell assembly having a plurality of pouch-type battery cells stacked and arranged in one direction with broad surfaces being erect and accommodated in the module housing;
a sensing assembly configured to electrically connect electrode leads extending from the plurality of pouch-type battery cells and cover a front portion and a rear portion of the cell assembly, respectively;
a pack case having a box shape capable of accommodating the at least one battery module in an inner space thereof; and
a coolant supplier coupled to one side of the pack case to supply a cooling air to the ventilation holes at one side of the at least one battery module;
wherein flow paths through which a cooling air flows are formed between the top plate and the cell assembly and between the bottom plate and the cell assembly, respectively, the top and bottom plates serving as upper and lower portions of the module housing,
wherein ventilation holes for allowing the cooling air to flow into and out of the flow path are formed at a top end and a bottom end of the sensing assembly,
wherein the at least one battery module is at least two battery modules disposed in parallel so that the ventilation holes of the battery modules are located on a same line,
wherein the ventilation holes located in a front portion of the battery modules are defined as inlet ventilation holes through which the cooling air is introduced, and the ventilation holes located in a rear portion of the battery modules are defined as outlet ventilation holes through which the cooling air is discharged, and
wherein the pack case includes a coolant channel provided inside the pack case along a first direction in which the inlet ventilation holes of the battery modules are arranged and configured to communicate with the coolant supplier so that the cooling air is guided to flow in the first direction.

9. The battery pack according to claim 8, wherein the coolant channel has a longitudinal section of an arc shape that is in contact with the sensing assembly so that an open end of the coolant channel surrounds the inlet ventilation holes.

10. The battery pack according to claim 8, wherein the pack case includes an upper plate contacting the top plate of the battery module and a lower plate contacting the bottom plate of the battery module, and
wherein the coolant channel includes an upper coolant channel integrally formed with the upper plate and a lower coolant channel integrally formed with the lower plate.

11. The battery pack according to claim 10, wherein the sensing assembly further includes an upper protruding plate contacting a bottom of a lower surface of the upper coolant channel and a lower protruding plate contacting a top of an upper surface of the lower coolant channel.

12. The battery pack according to claim 8, wherein the pack case includes a wall having at least one opening and facing the outlet ventilation holes of the battery modules.

13. The battery pack according to claim 10, wherein the coolant supply unit includes:
a fan provided at an outer side of the pack case; and
a fan duct divided into two branches from the fan to communicate with the upper coolant channel and the lower coolant channel.

14. The battery module according to claim 1, wherein a bottom surface of each battery cell of the plurality of pouch-type battery cells is V-shaped to create two spaces between the bottom surface of each battery cell and the bottom plate.

15. The battery module according to claim 1, further comprising a heat pipe in one of the two spaces between the bottom surface of each battery cell and the bottom plate.

* * * * *